(12) United States Patent
Faskin et al.

(10) Patent No.: US 11,114,680 B2
(45) Date of Patent: Sep. 7, 2021

(54) REDOX FLOW BATTERY SYSTEM

(71) Applicant: Renewable Energy Dynamics Technology Ltd, Dublin (IE)

(72) Inventors: Keith Faskin, Selkirkshire (GB); Graham Ford, Livingston Lothian (GB)

(*) Notice: Subject to any disclaimer, the term of this patent is extended or adjusted under 35 U.S.C. 154(b) by 399 days.

(21) Appl. No.: 15/740,222

(22) PCT Filed: Jul. 1, 2016

(86) PCT No.: PCT/IB2016/053987
§ 371 (c)(1),
(2) Date: Dec. 27, 2017

(87) PCT Pub. No.: WO2017/006232
PCT Pub. Date: Jan. 12, 2017

(65) Prior Publication Data
US 2018/0191005 A1   Jul. 5, 2018

(30) Foreign Application Priority Data
Jul. 3, 2015   (GB) ..................................... 1511695

(51) Int. Cl.
*H01M 8/0289* (2016.01)
*H01M 8/04186* (2016.01)
*H01M 8/04082* (2016.01)
*H01M 8/18* (2006.01)

(52) U.S. Cl.
CPC ..... *H01M 8/0289* (2013.01); *H01M 8/04186* (2013.01); *H01M 8/04201* (2013.01); *H01M 8/188* (2013.01); *Y02E 60/50* (2013.01)

(58) Field of Classification Search
CPC ........... H01M 8/0289; H01M 8/04201; H01M 8/188; H01M 8/4186; H01M 8/1018; Y02E 60/528

USPC ......................................................... 429/492
See application file for complete search history.

(56) References Cited

U.S. PATENT DOCUMENTS

| 2010/0092813 | A1* | 4/2010 | Sahu ................... H01M 8/0432 429/409 |
| 2011/0282807 | A1 | 11/2011 | Colello |
| 2012/0308867 | A1* | 12/2012 | Winter .................. H01M 8/188 429/101 |

FOREIGN PATENT DOCUMENTS

| CN | 204577514 U | * | 8/2015 |
| WO | 2012/087454 | | 6/2012 |
| WO | 2013/038368 | | 3/2013 |

OTHER PUBLICATIONS

Machine Translation of Ren Feng et al. CN 204577514 "Device for Thermostatic Control of Full Vanadium Redox Flow Battery Electrolyte" (Year: 2015).*

* cited by examiner

*Primary Examiner* — Brian R Ohara
(74) *Attorney, Agent, or Firm* — Blue Filament Law PLLC

(57) ABSTRACT

A reservoir for a redox flow battery comprising:
at least one inner tank for electrolyte, the or each inner tank having at least one inner tank wall,
an outer, bund tank around the or each inner tank,
air circulation gaps or passages between the inner and outer walls or the inner and outer tanks and
means for passing cooling air to the air circulation gaps or passages for cooling the electrolyte in or each inner tank.

20 Claims, 20 Drawing Sheets

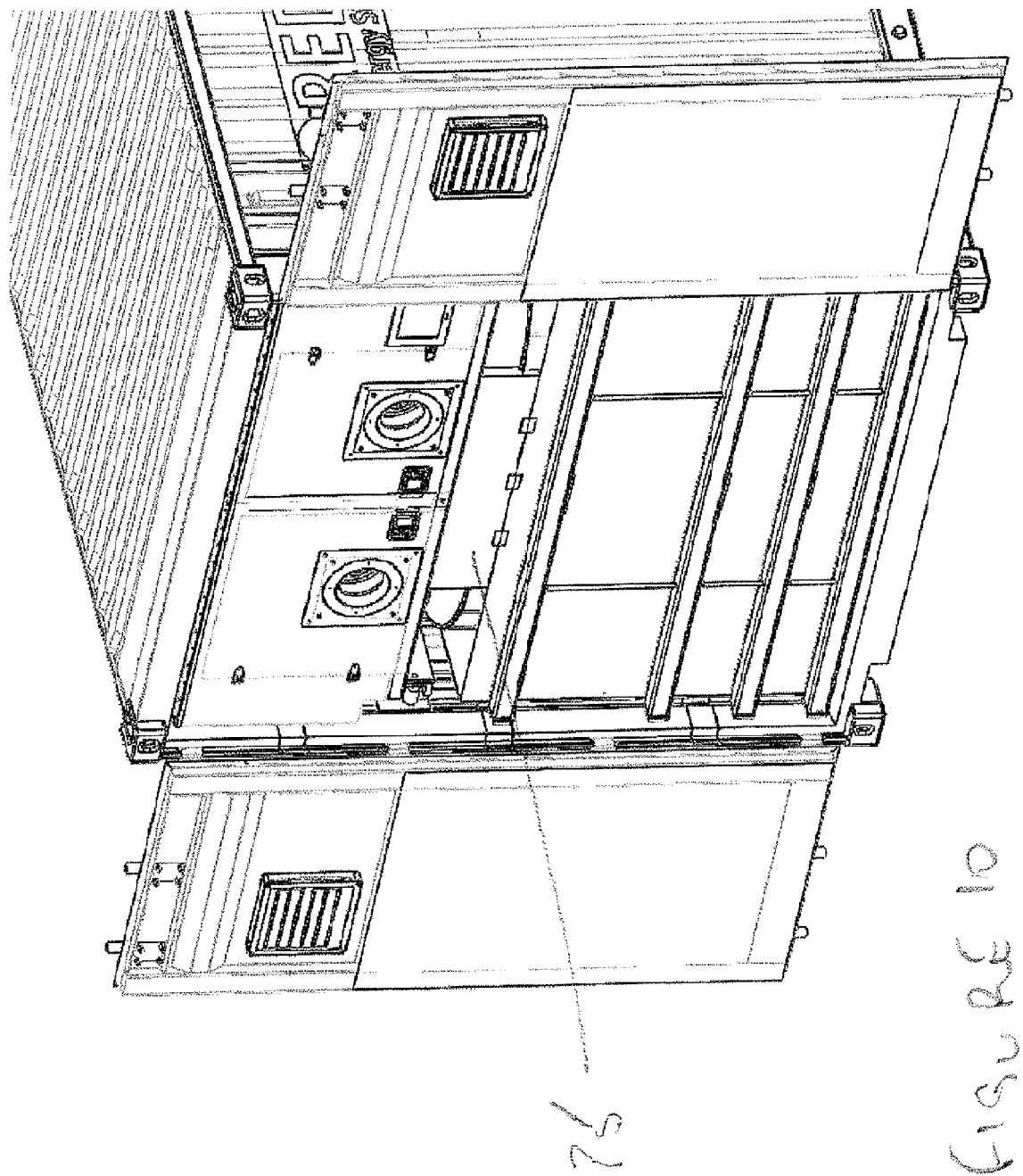

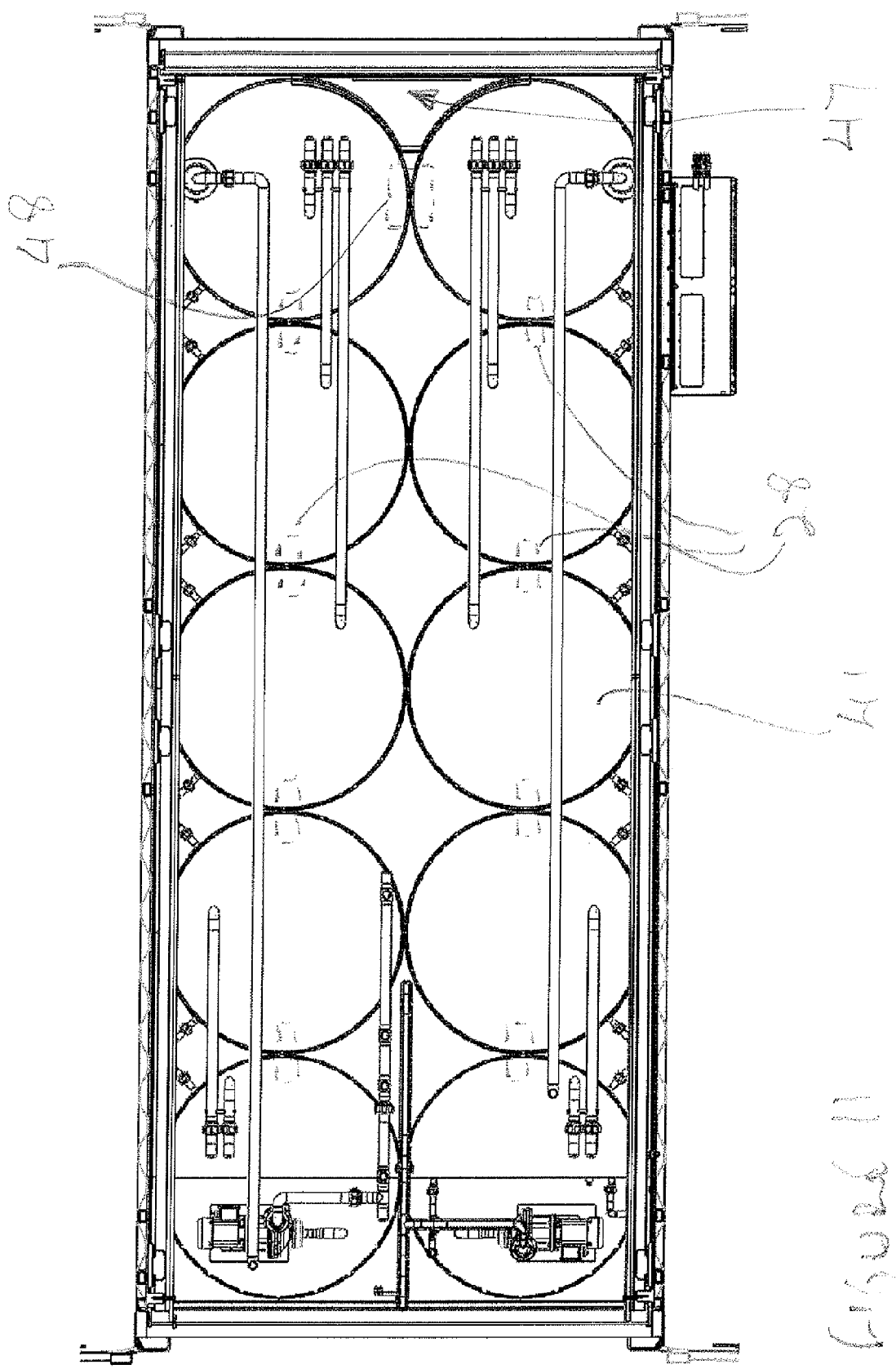

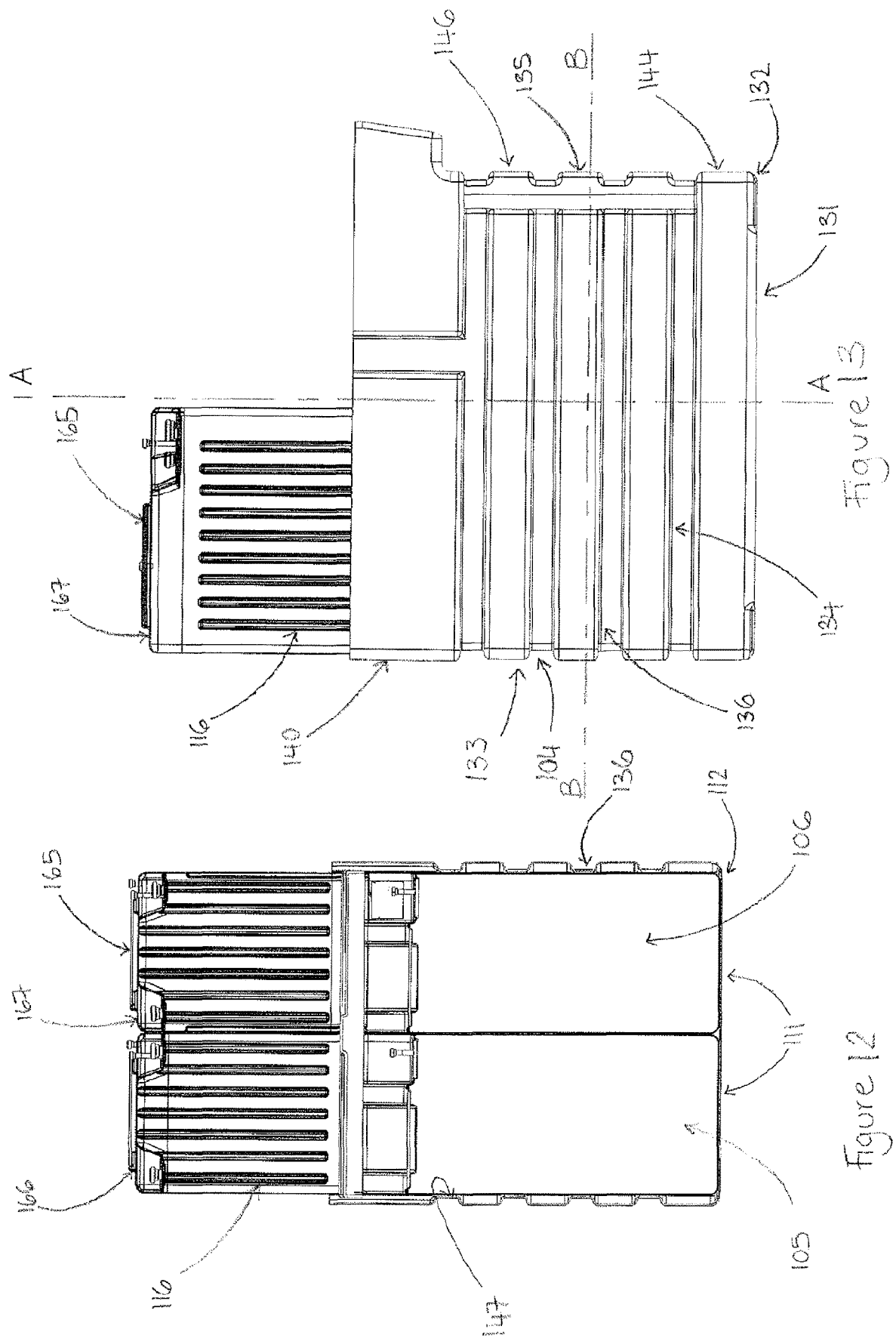

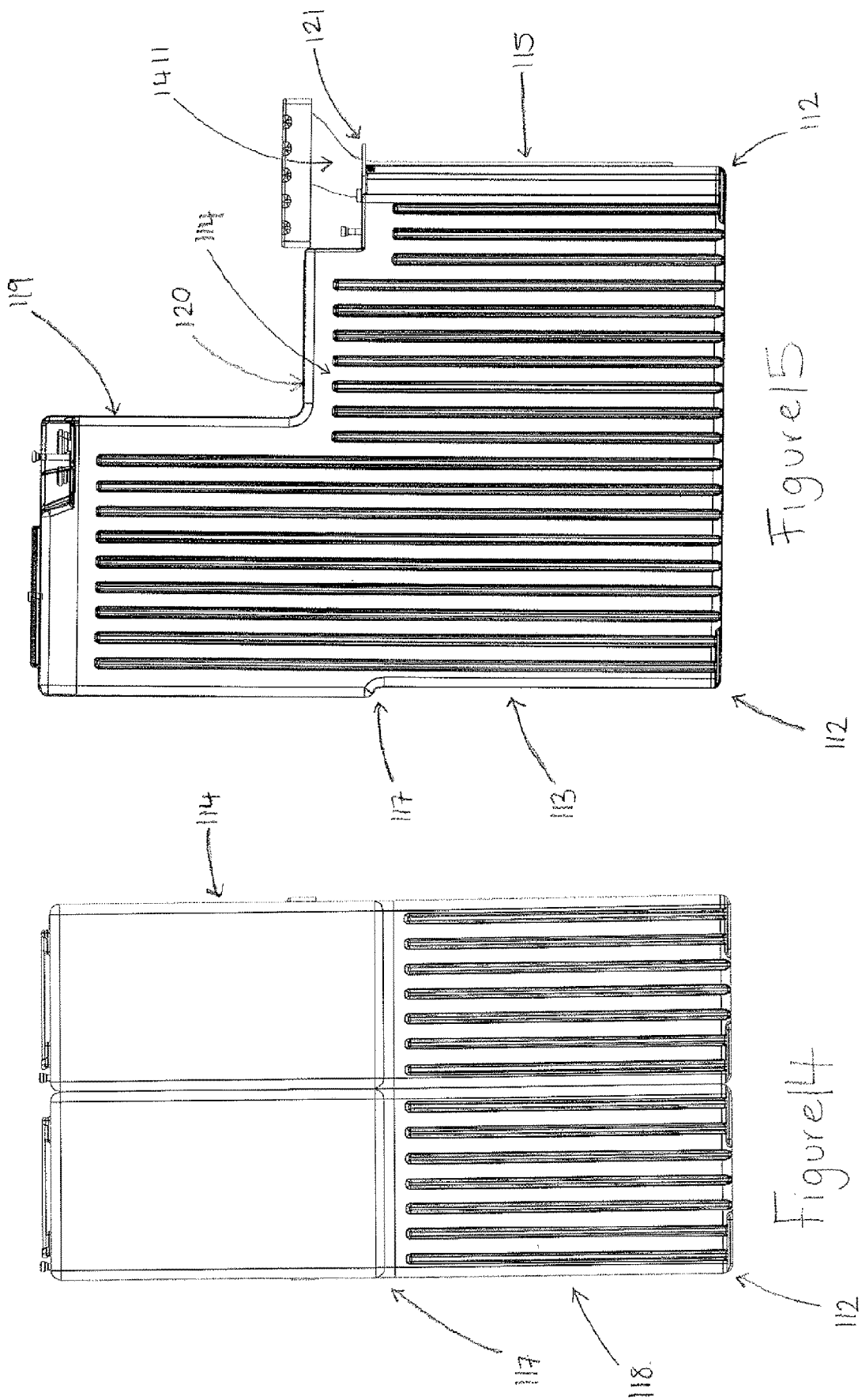

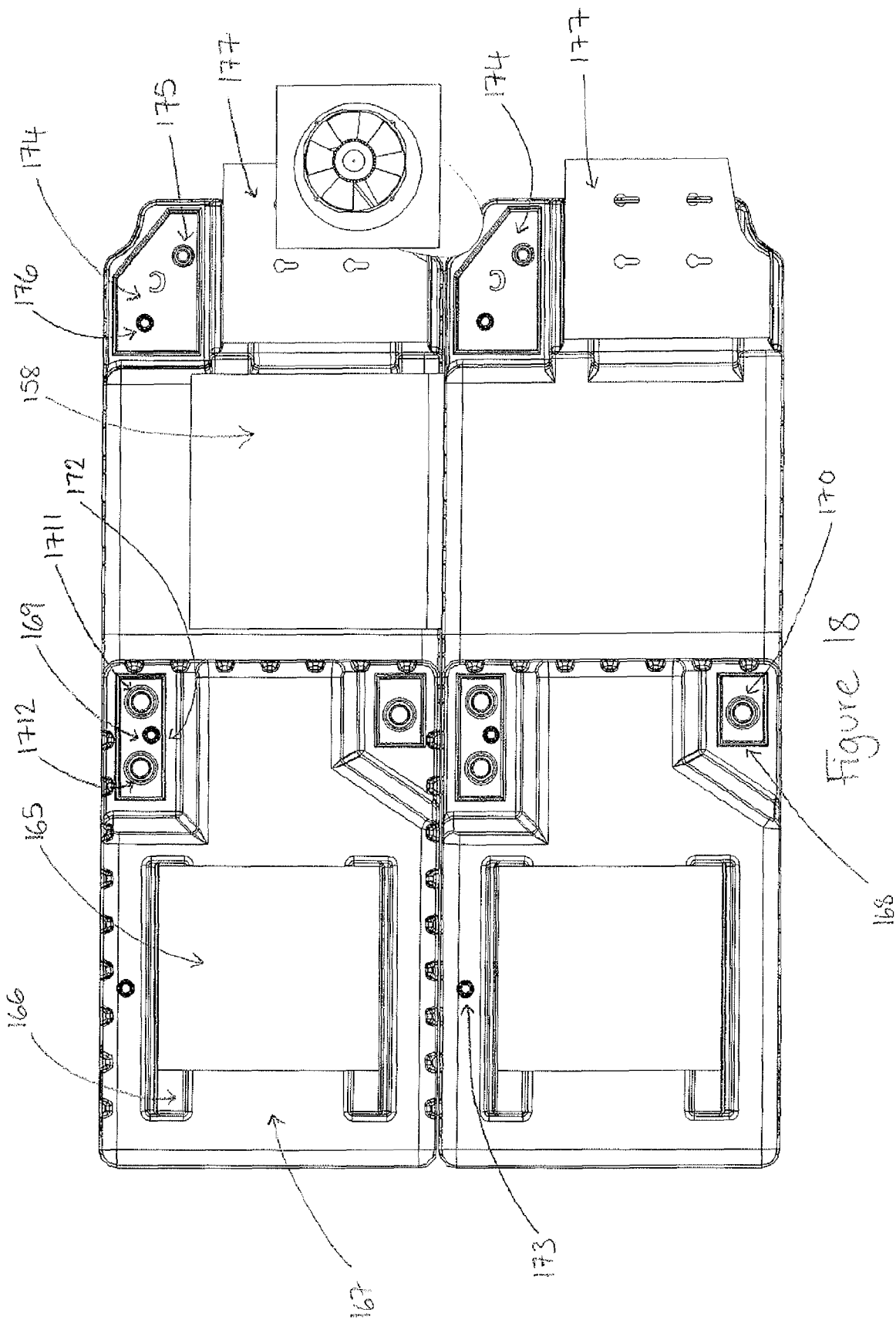

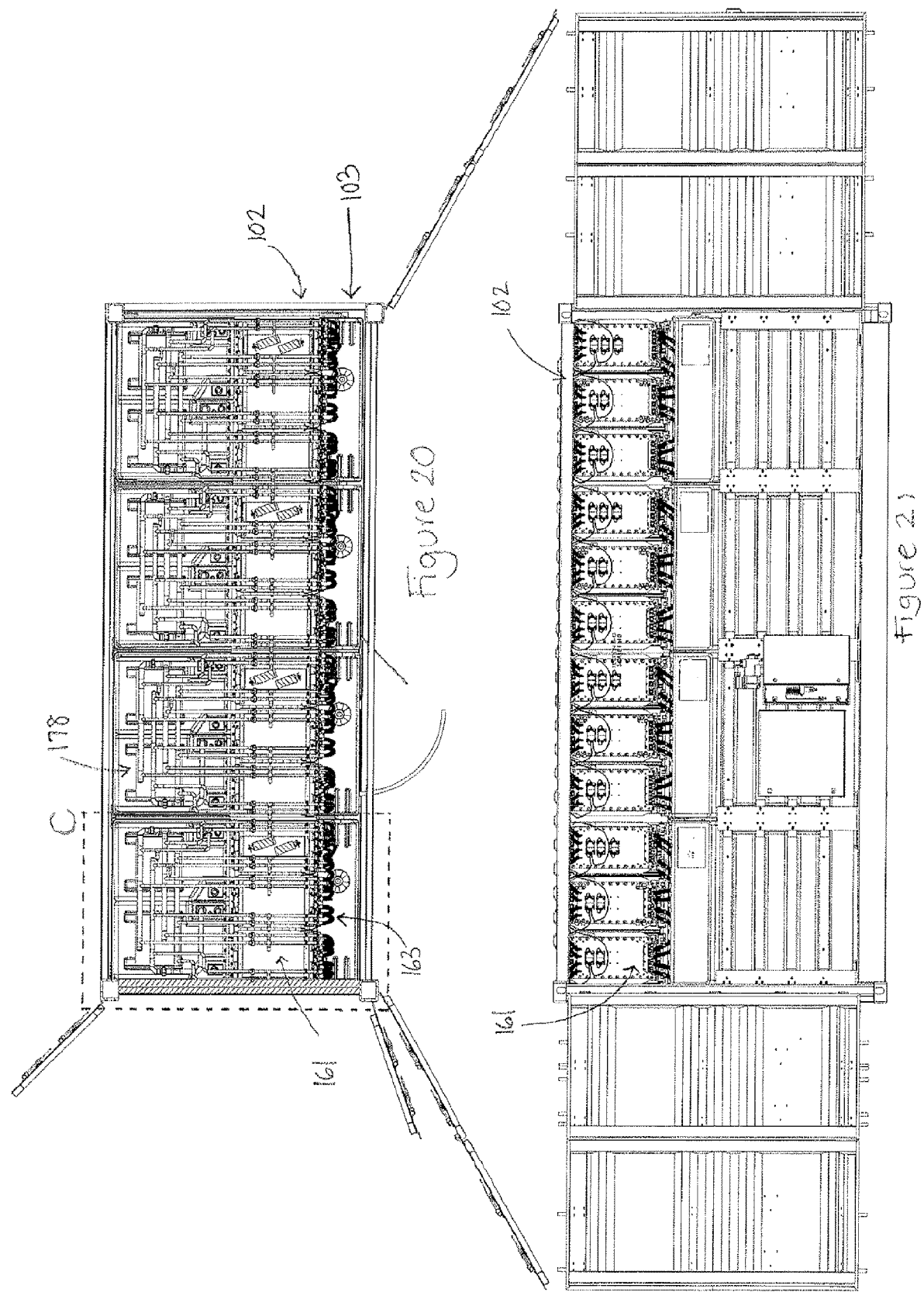

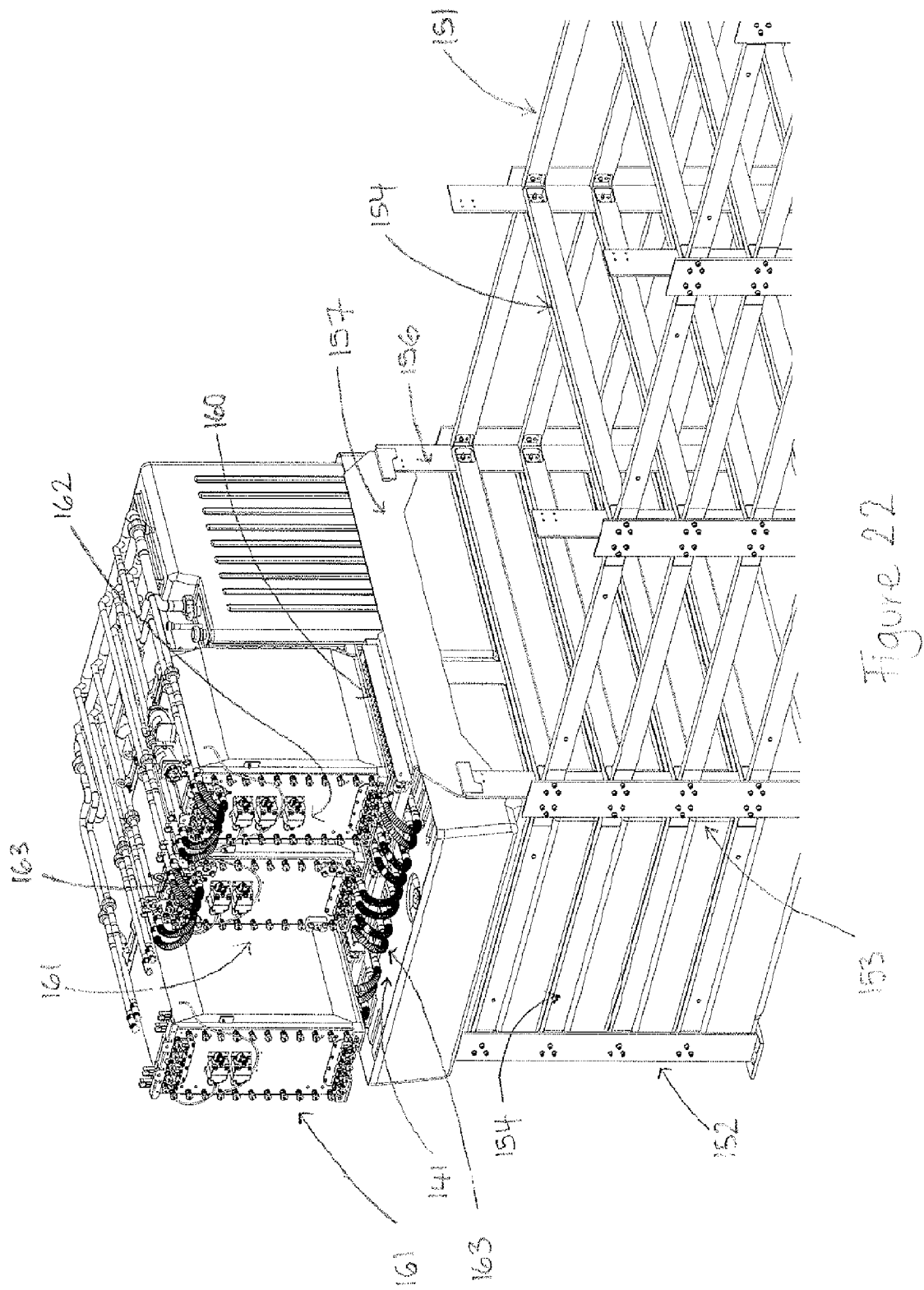

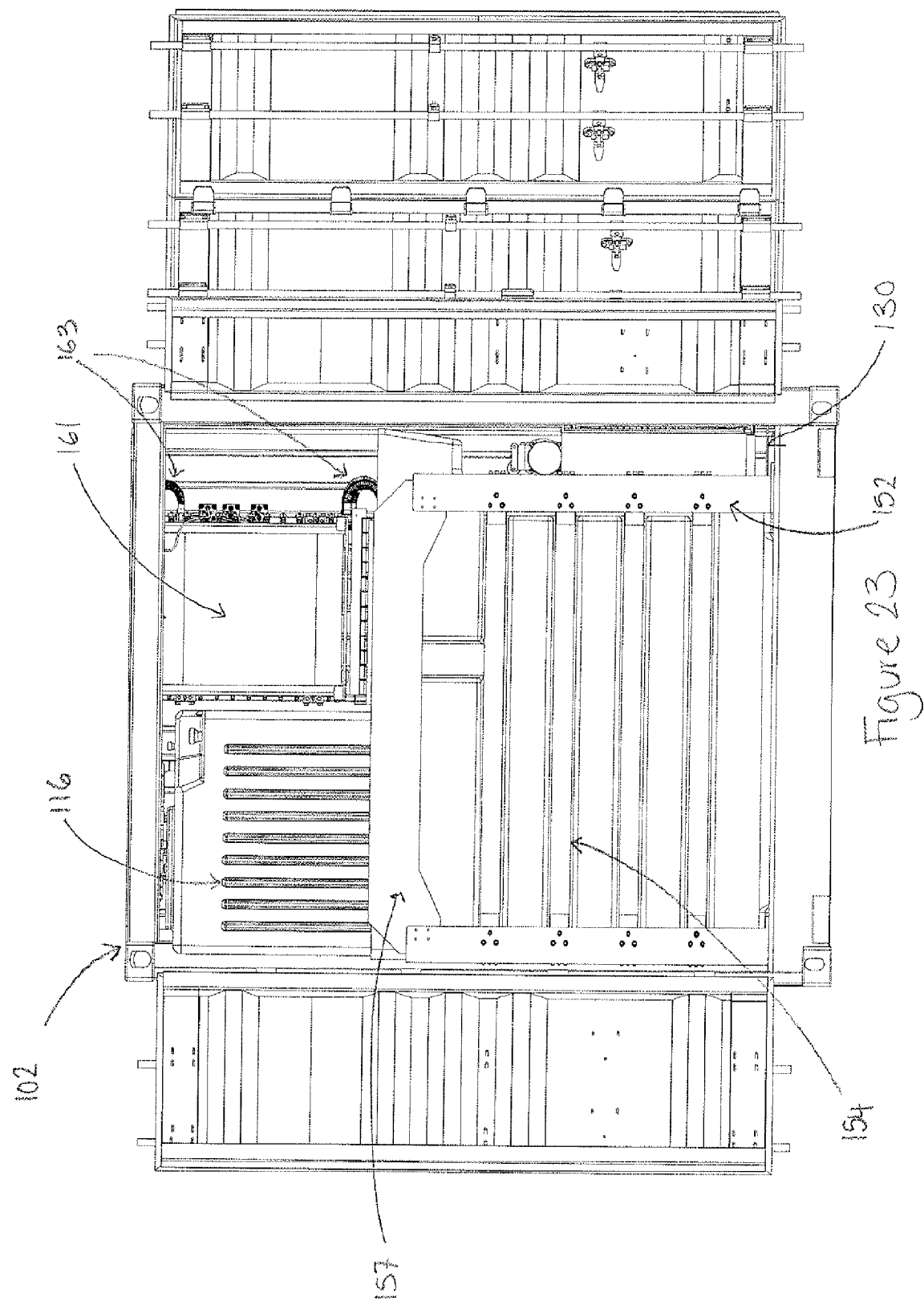

REDOX FLOW BATTERY SYSTEM

CROSS REFERENCE TO RELATED APPLICATION

This application is for entry into the U.S. National Phase under § 371 for International Application No. PCT/IB2016/053987 having an international filing date of Jul. 1, 2016, and from which priority is claimed under all applicable sections of Title 35 of the United States Code including, but not limited to, Sections 120, 363, and 365(c), and which in turn claims priority under 35 USC 119 to Great Britain Patent Application No. 1511695.7 filed on Jul. 3, 2015.

The present invention relates to reservoirs and reagent supply means in particular, though not exclusively, for a vanadium redox battery.

In a redox flow battery, reagents are passed to opposite sides of an ionically selective and conductive membrane separator separating two reagent compartments, electrodes being provided in the respective compartments. The reagents are a complementary pair of electrolytes, i.e. an anolyte and a catholyte. Electricity flows between the reagents via the electrodes, as a result of ionic flow between the reagents through the separator. During discharge, these flows are in one direction and during charging they are reversed. Further, during discharge, the redox ions (not the ions passing through the separator) in the anolyte are oxidised and other redox ions in the catholyte are reduced. During conventional charging, the anolyte ions are reduced and the catholyte ions are oxidised. This is in accordance with the "anolyte" and "catholyte" meaning in accordance with U.S. Pat. No. 4,786,567 and European Patent No 0829104. The latter acknowledges that this is an unusual convention in that the anode is in catholyte and the cathode is in anolyte. For the purposes of the present invention, which concerns arrangements for storing and distributing the respective anolyte and catholyte, the naming convention is of less significance than the electrolyte storage and supply means.

A small leakage of redox ions may occur through the separator.

In the preferred redox flow batteries the redox ions are of the same metal, vanadium, and as such their transfer between electrolytes causes no contamination. An understanding of the reactions in a vanadium redox flow battery can be found in U.S. Pat. No. 4,786,567.

Such a redox flow battery requires reservoirs of the electrolytes and means for supplying them to and from the reagent compartments, e.g. pipes and pumps.

As used in this specification, the term "redox flow battery" is used to mean at least one redox fuel cell per se, together with a pair of electrolyte reservoirs, i.e. one for anolyte and the other for catholyte, and electrolyte supply means, i.e. means for circulating anolyte from its reservoir, to its compartment in the cell and back to the reservoir and like circulating means for catholyte. Usually, the battery will have several cells each supplied with anolyte and catholyte from a single pair of reservoirs.

The object of the present invention is to provide improvements in redox flow batteries.

According to the invention there is provided a reservoir for a redox flow battery comprising:
  at least one inner tank for electrolyte, the or each inner tank having at least one inner tank wall,
  an outer, bund tank around the or each inner tank, the or each outer tank having at least one outer tank wall,
  air circulation gaps or passages between the inner and outer walls or the inner and outer tanks and
  means for passing cooling air to the air circulation gaps or passages for cooling the electrolyte in or each inner tank.

Whilst the reservoir may include only a single outer tank and a pair of inner tanks within it, normally there will be a plurality of pairs of inner tanks, each with an outer tank around them. It is possible that more than one pair of inner tanks could be provided in each inner tank, but at least in the second embodiment cuboid tank format, a single pair of inner tanks is provided in each outer tank.

The or each inner wall can be provided as a self-supporting circular cylindrical wall, preferably of polymeric material, of its inner tank, as in the first embodiment below.

Alternatively as in the second embodiment:
the or each outer wall is at least substantially flat,
reinforcement is provided around the outer tank for its support in event of inner tank leakage and the outer tank acting as a bund and
the air circulation gaps or passages are spaces between the or each circular inner tanks and the substantially flat walled outer tank.

Whilst the reinforcement could be of polymeric or other synthetic material, preferably, it is a metal fabrication. This can be at least partially provided by walls of an ISO transport container, in which the tanks are installed.

As in the second embodiment, the inner and outer tanks can be complementarily shaped, with the walls, preferably of polymeric material, of at least one of the tanks, and preferably both, being formed with:
  areas for abutting support of the inner by the outer and
  air circulation passage formations between the abutment areas.

Preferably:
the walls are at least substantially flat,
reinforcement is provided around the outer tank for its support in event of inner tank leakage and the outer tank acting as a bund and
the air circulation gaps or passages are passages within the air circulation passage formations.

Further preferably:
the reinforcement is a metal framework, preferably provided within a transport container, in which the tanks are installed;
the metallic fabrication is provided as a framework around the reservoir, the framework preferably being contained within a transport container;
members of the framework are received in outer grooves of at least some of the outer walls, the grooves having bottoms providing the abutment support areas;
at least two inner tanks are provided within the or each outer tank, the inner tanks having neighbouring ones of their inner walls which abuttingly support each other, preferably with a reinforcing sheet between the neighbouring ones of their inner walls which abuttingly support each other, the inner tanks being respectively for anolyte and catholyte;
a plurality of outer tanks each with two inner tanks is provided in a transport container;
either or both of the inner and outer walls are corrugated to provide the air passage formations and the abutment support areas;
corrugations of the inner walls and of the outer walls are orthogonal for distribution of air circulation;
two inner tanks are provided and their wall corrugations are at least substantially vertical and their inner walls have rounded lower corners with inner tank bottoms for providing air circulation to bottoms of the corrugations;

the inner and outer tanks, including their walls, are formed as rotational mouldings;

the inner tanks are substantially cuboid with an upper, primary cuboid recess for accommodating redox cell stacks;

the inner tanks have a secondary cuboid recess below the primary recess for locating electrolyte circulation pumps for the respective electrolytes of the inner tanks, preferably with electrolyte flow connections at the secondary recess and return connections at tops of the inner tanks;

there are provided:
  an air circulation pump between the electrolyte pumps, for discharging air downwards for upwards return;
  control circuitry for powering the air circulation pump in accordance with whether the electrolyte circulation pumps are being operated and/or thermostatically in accordance with the temperature of the electrolyte in the inner tanks;
  rails, supported on the framework, for sliding accommodation of the stacks; and
  plumbing provided with detachable connections for electrolyte flow and return to and from the stacks;

flow and return plumbing is branched to provide parallel flow paths to the stacks for electrolyte flow and return to two halves of the stacks;

the tanks are arrayed along the length of a side opening transport container, preferably with a lengthways walkway within the container for access to the individual tanks.

To help understanding of the invention, a specific embodiment thereof will now be described by way of example and with reference to the accompanying drawings, in which:

FIG. 10 is a similar view from another angle of the control box doors closed;

FIG. 11 is a plan view at a level below the cell stack chassis, showing the tops of the tanks;

FIG. 12 is a front cross-sectional view of the tanks of FIG. 13 through line "A-A";

FIG. 13 is a side view of the tanks;

FIG. 14 is a rear view of the tanks with the outer tank removed;

FIG. 15 is similar view to FIG. 13 with the outer tank removed;

FIG. 18 is a plan view of FIG. 15;

FIG. 20 is a plan view of the cell stack within the container, with the top of the container removed;

FIG. 21 is a side view of the cell stack within the container;

FIG. 22 is a perspective view of the cell stack and support frame without the container;

FIG. 23 is an end view of the cell stack within the container;

Figure 1:
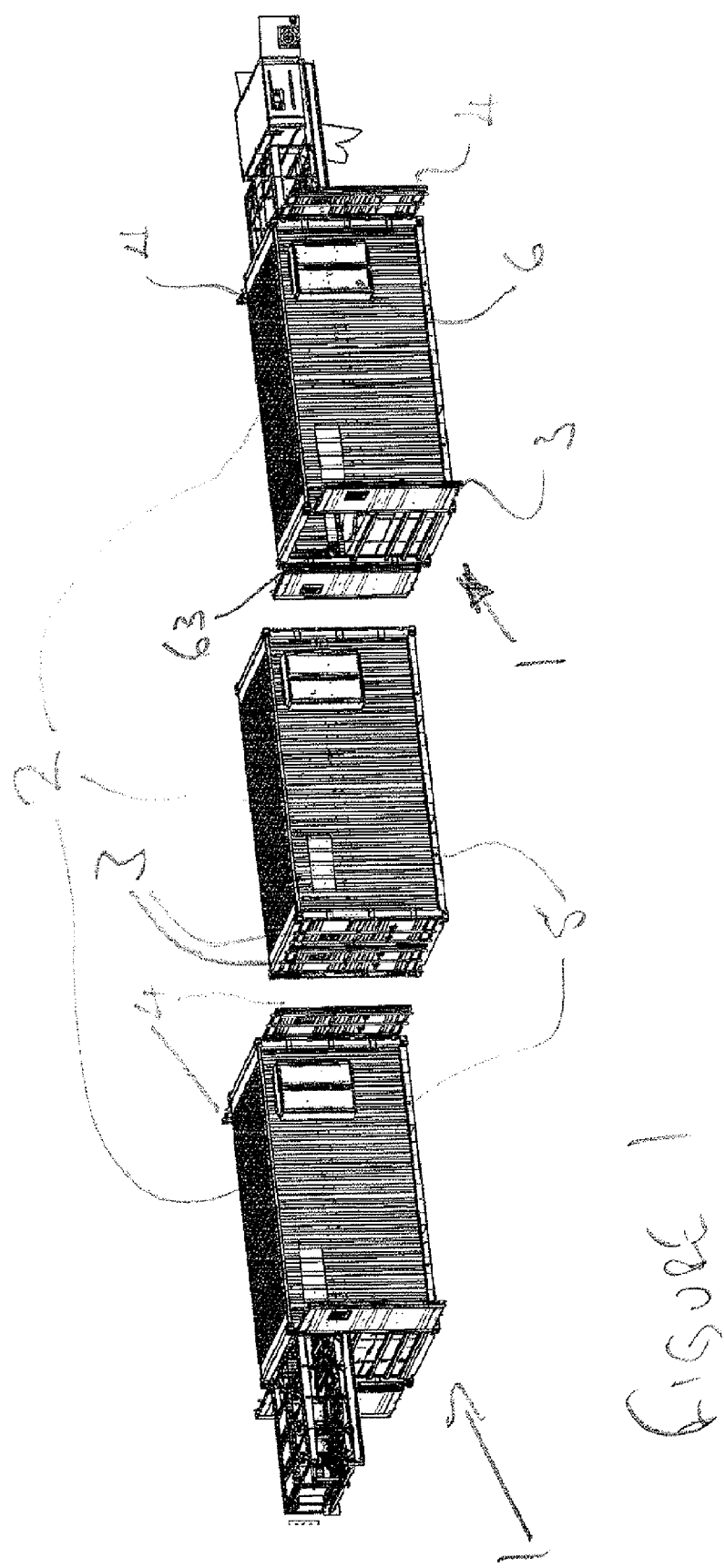
FIG. 1 is a perspective view of three ISO transport containers having redox flow batteries and flow stacks according to the invention, a central container being closed at one end, a left hand one being open at its left hand end with a cell stack chassis partially withdrawn and a right hand one similarly open.
Figure 2:
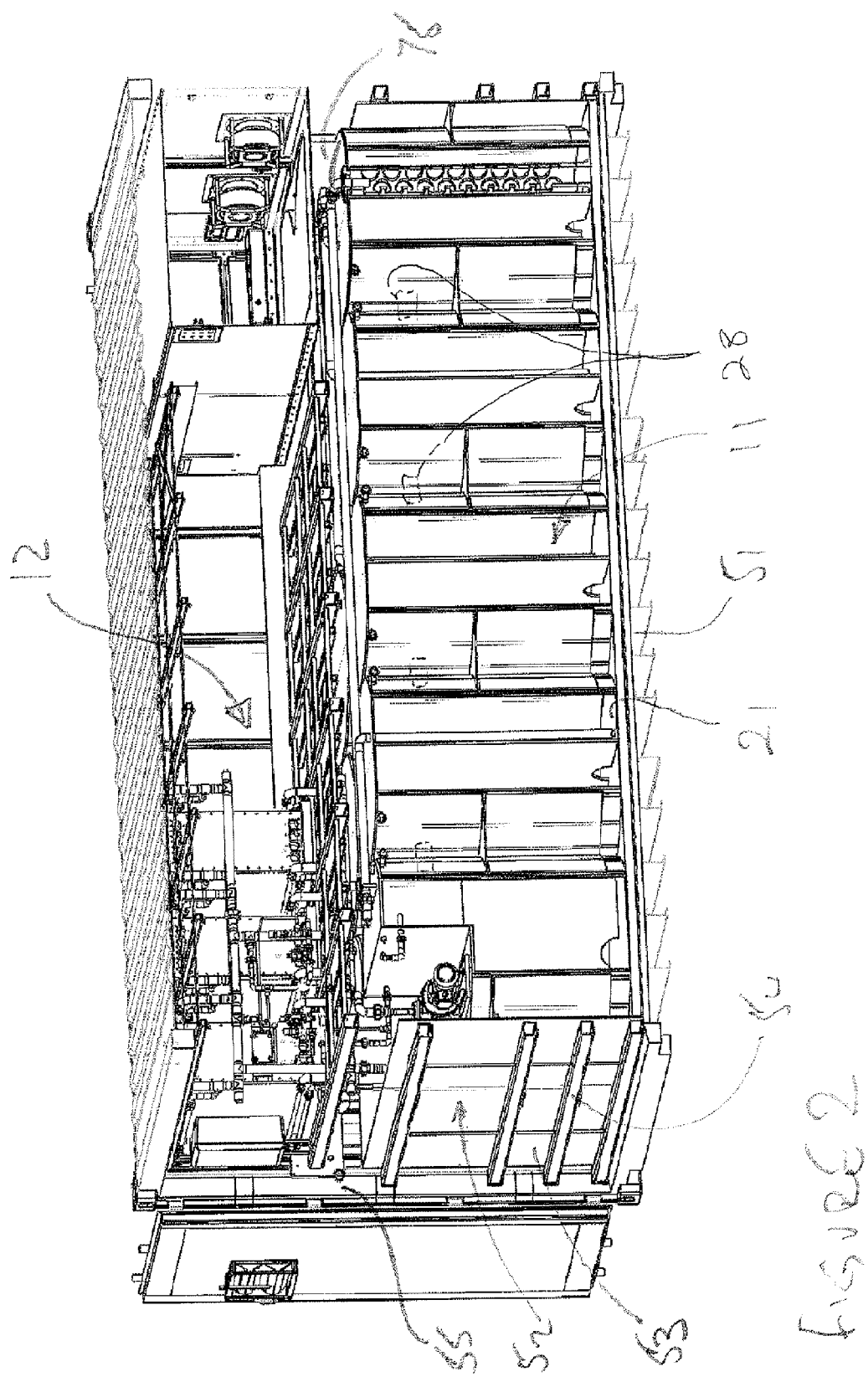
FIG. 2 is a longitudinal, vertical cross-section of the one of the containers of FIG. 1.
Figure 3:
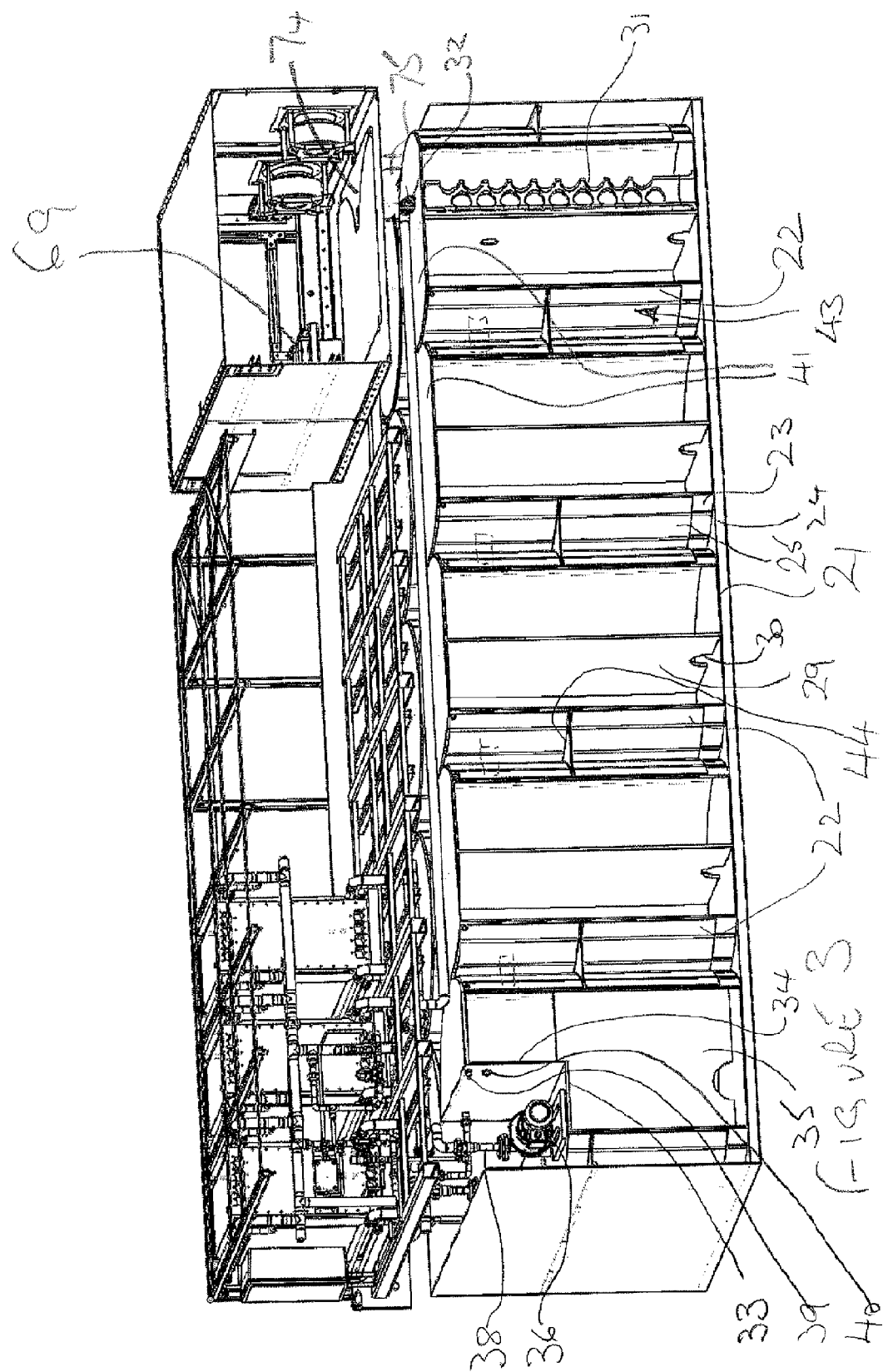
FIG. 3 is a cross-section similar to FIG. 2 with the container omitted.
Figure 4:
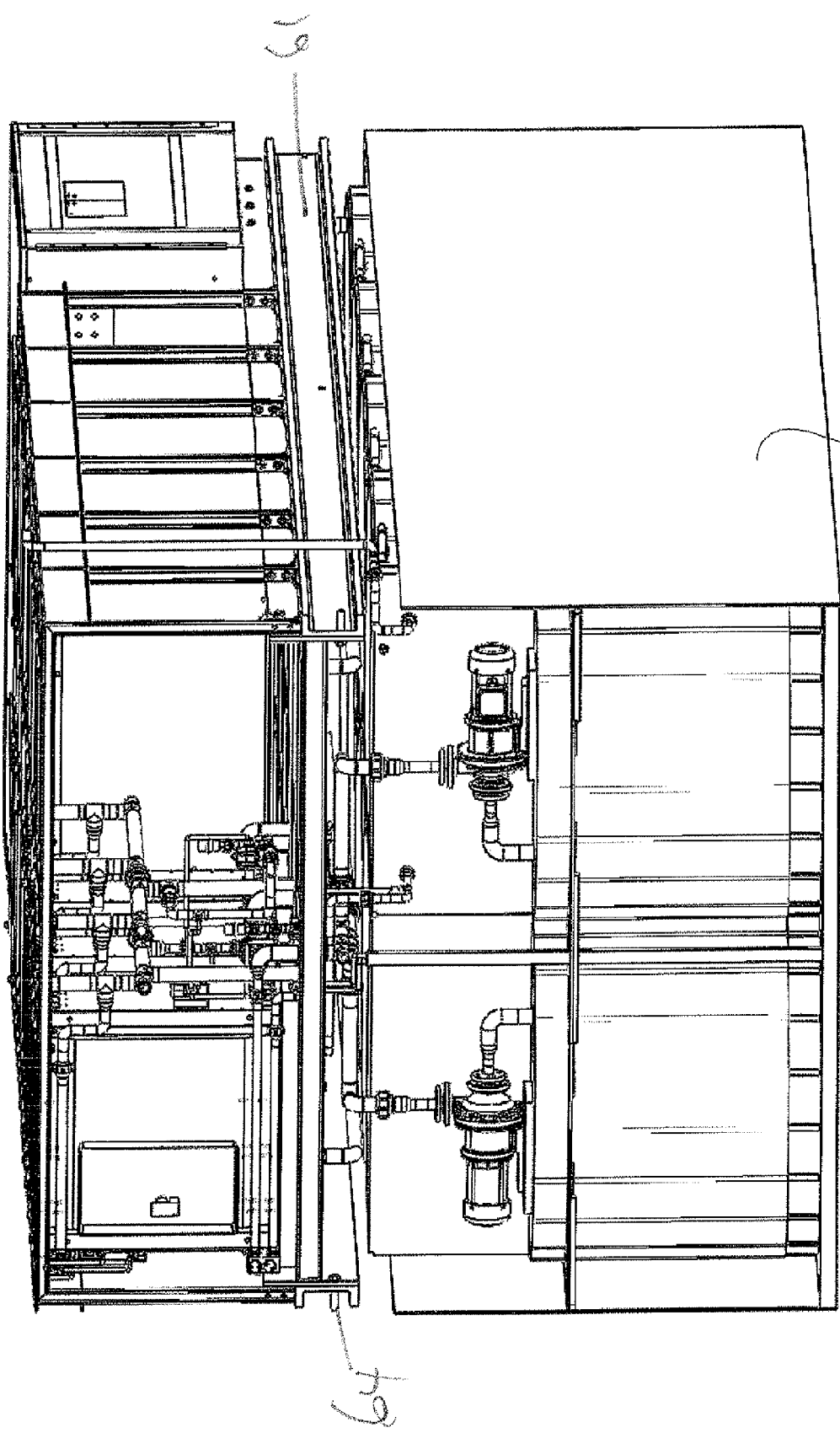
FIG. 4 is a perspective end view of the reservoir and cell stack chassis of FIG. 3.
Figure 5:
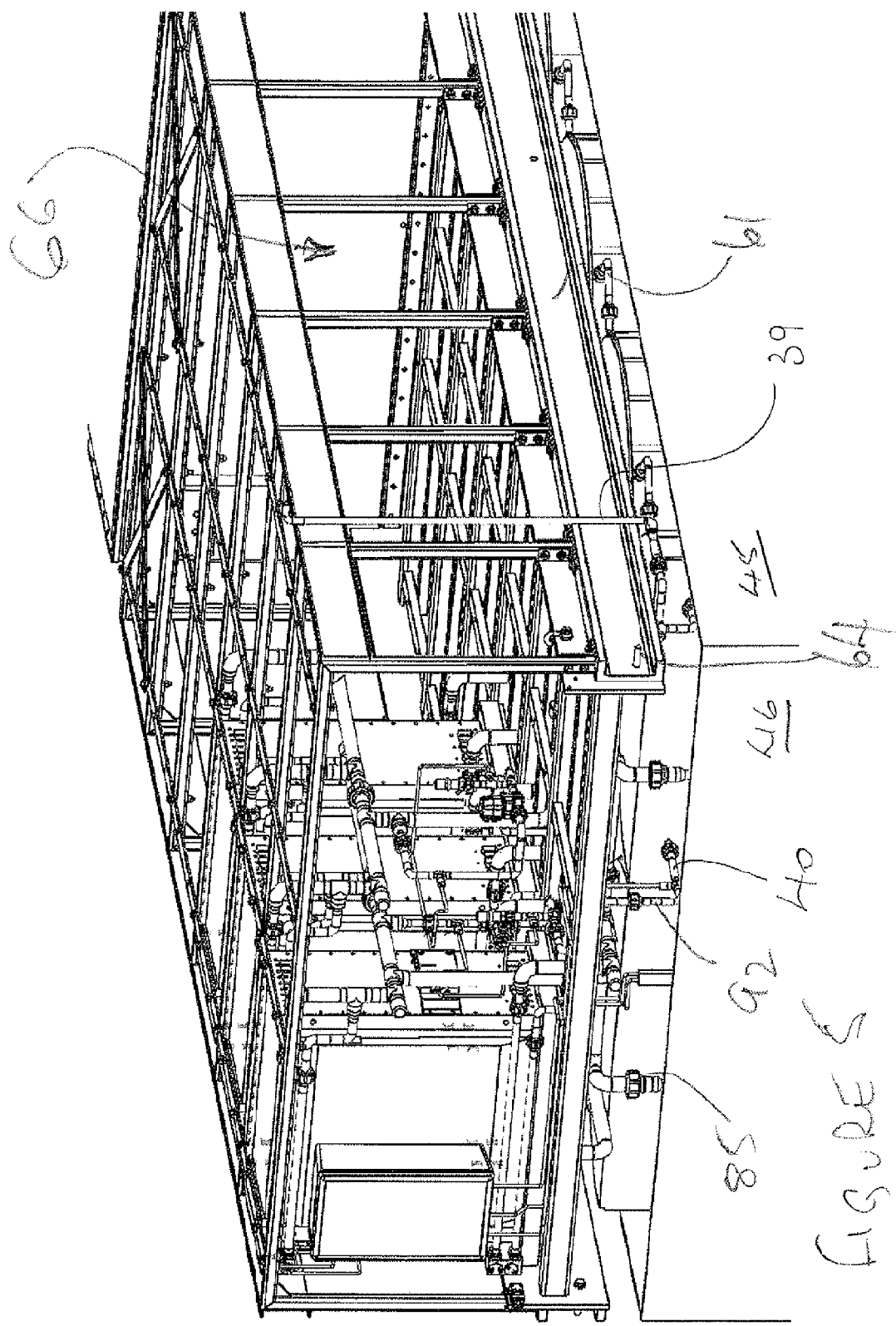
FIG. 5 is a view similar to FIG. 4 in more detail of the cell stack chassis.
Figure 6:
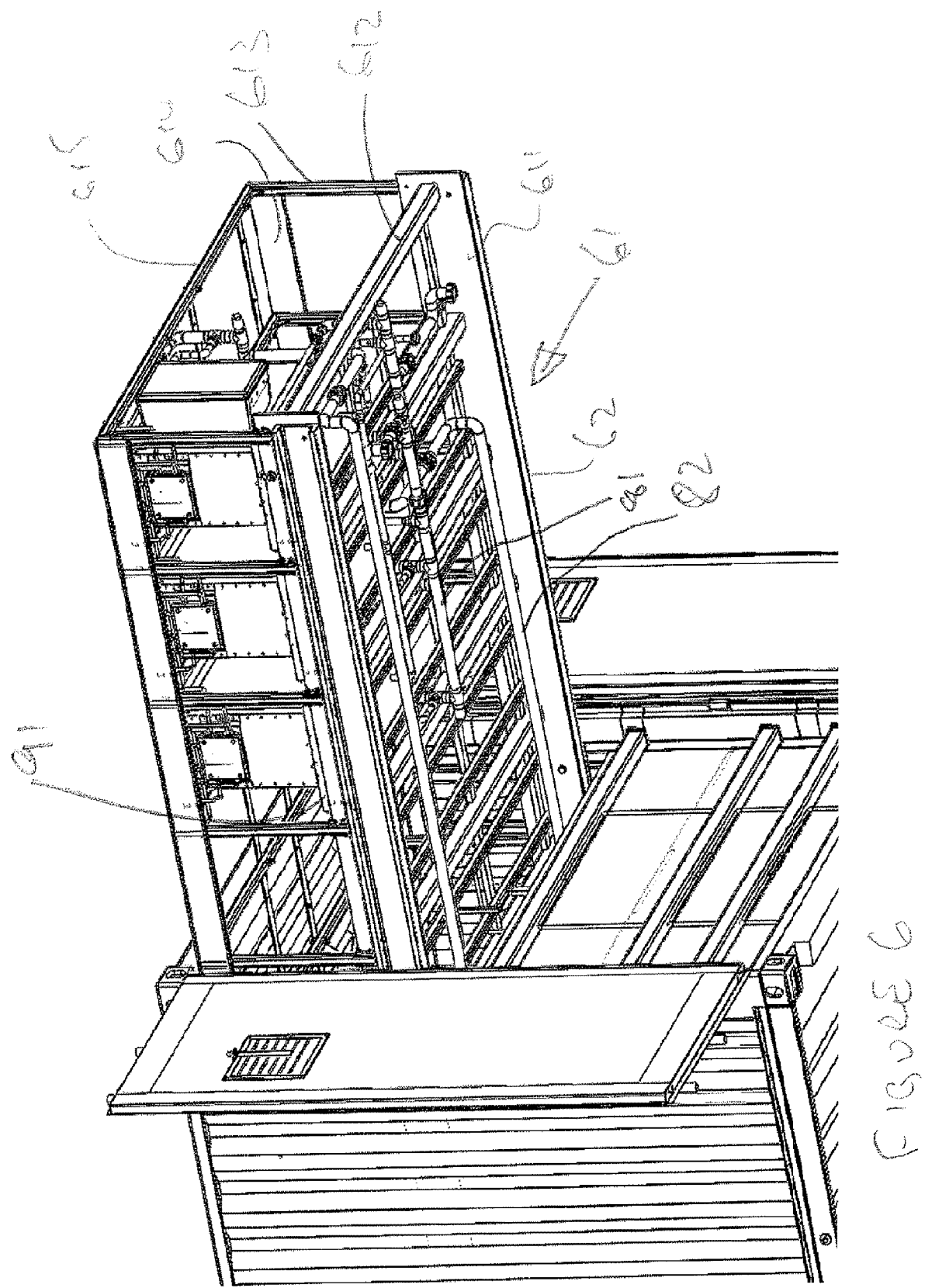
FIG. 6 is a underneath view of the cell stack chassis, withdrawn and showing a representative few cell stacks.
Figure 7:
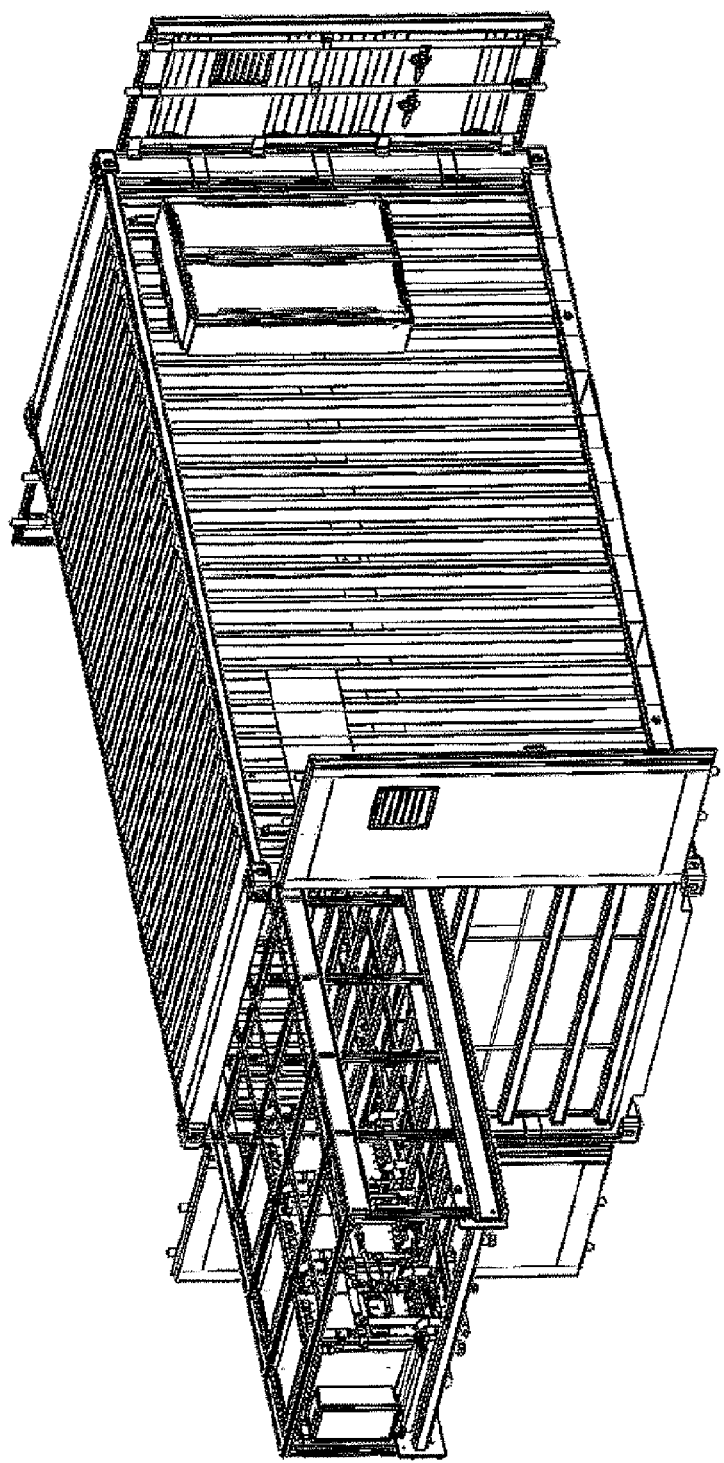
FIG. 7 is a perspective view of the cell stack chassis withdrawn.
Figure 8:
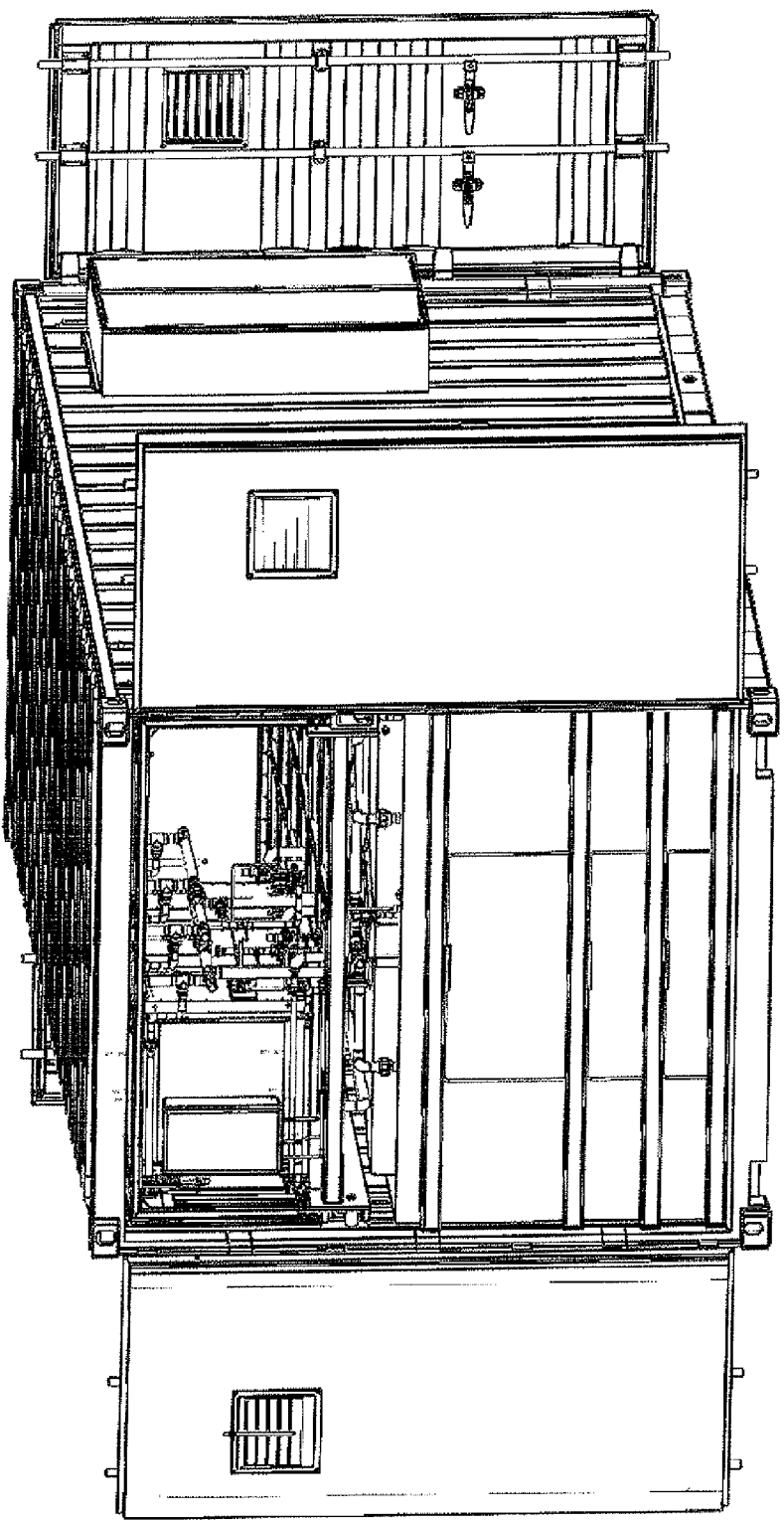
FIG. 8 is a similar view of the cell stack chassis within the container.
Figure 9:
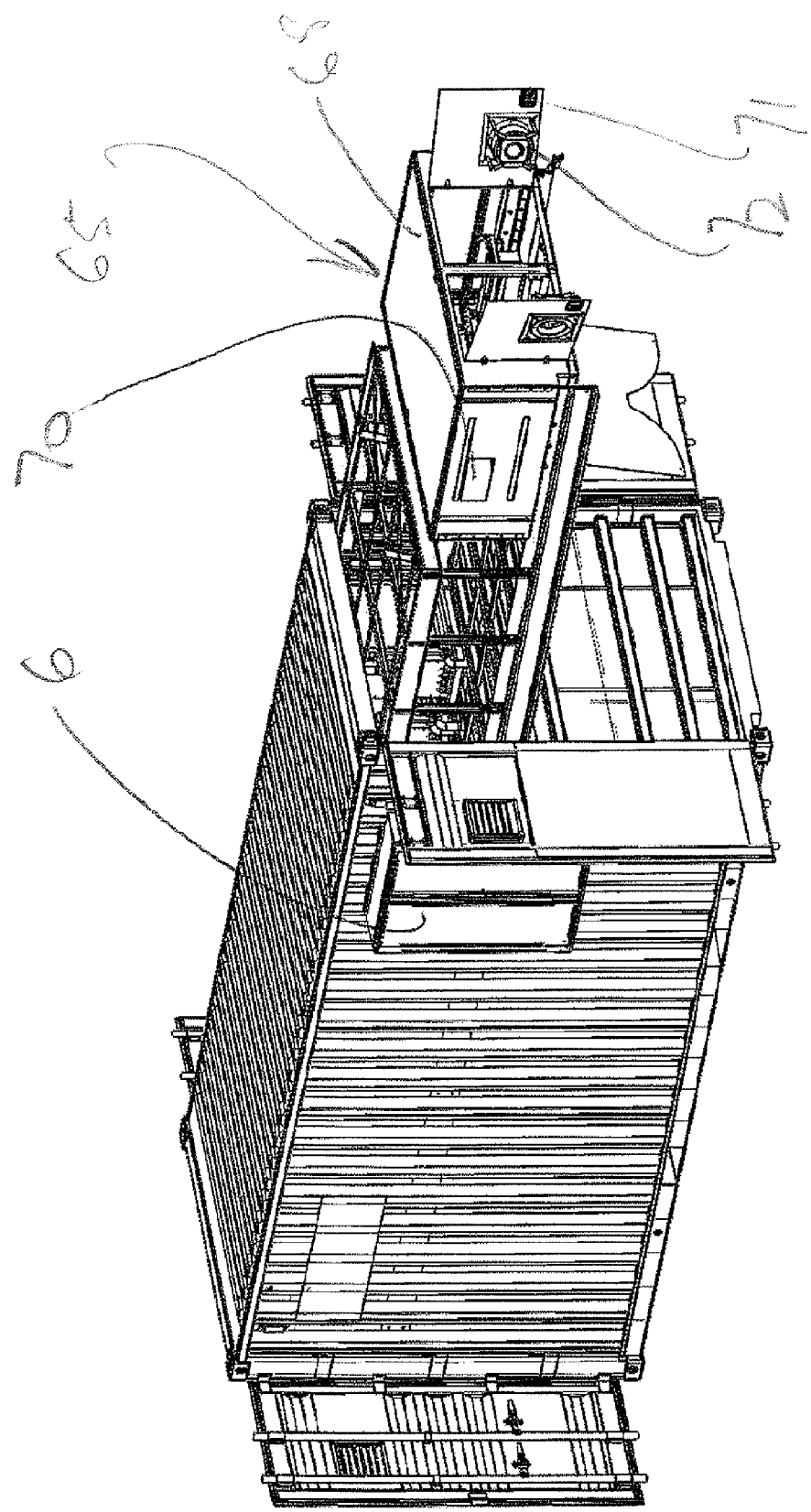
FIG. 9 is a similar view of the other end with the chassis oppositely withdrawn to show a control box with its doors open.
Figure 17:
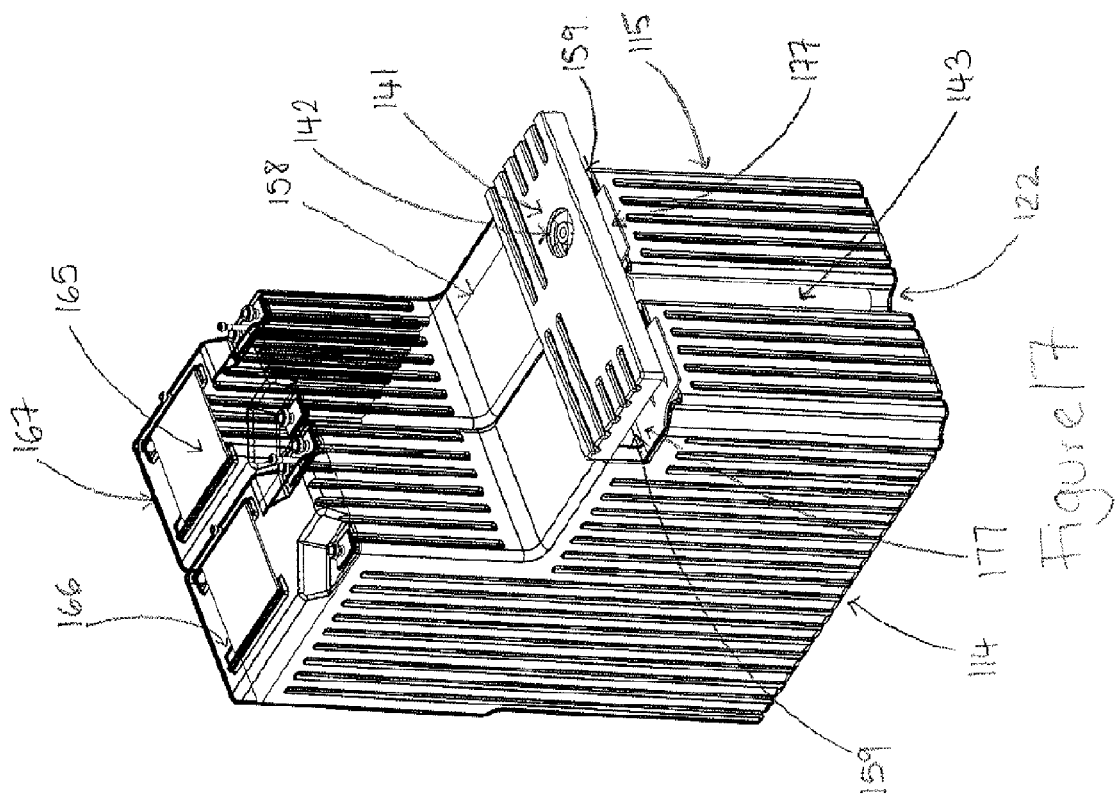
FIG. 17 is a perspective view of FIG. 15.
Figure 16:
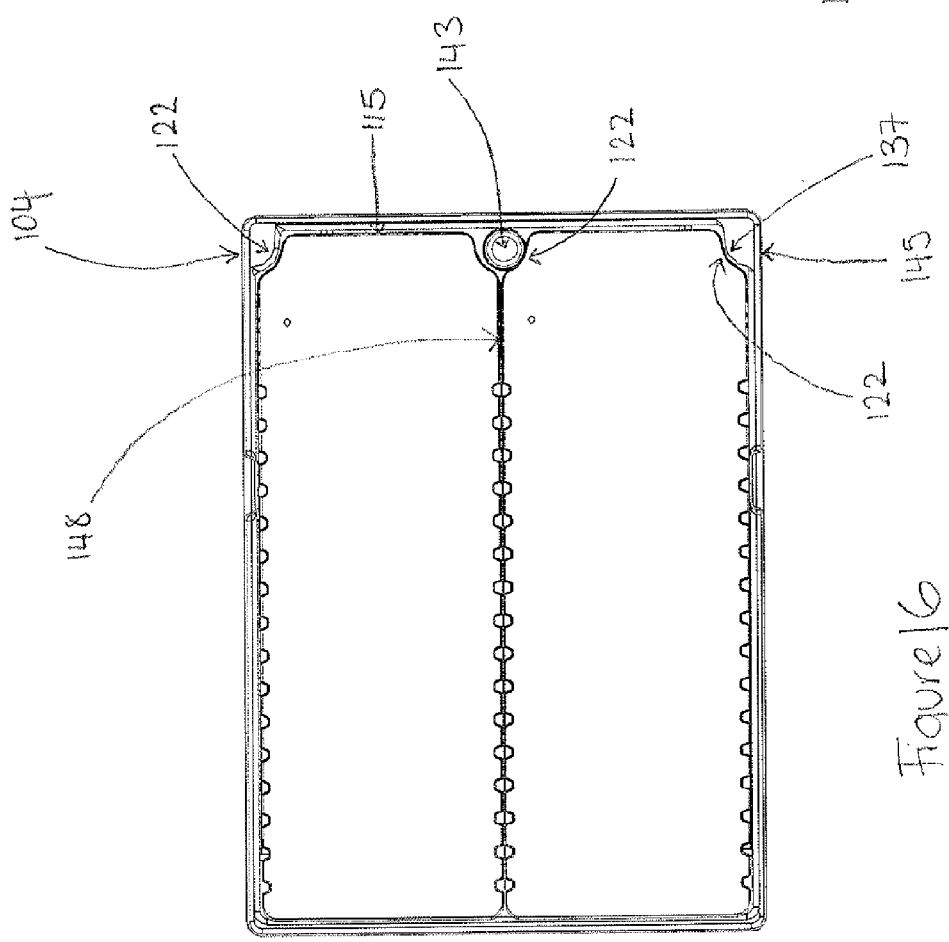
FIG. 16 is a cross-sectional plan view of the tanks of FIG. 13 through line "B-B"
Figure 19:
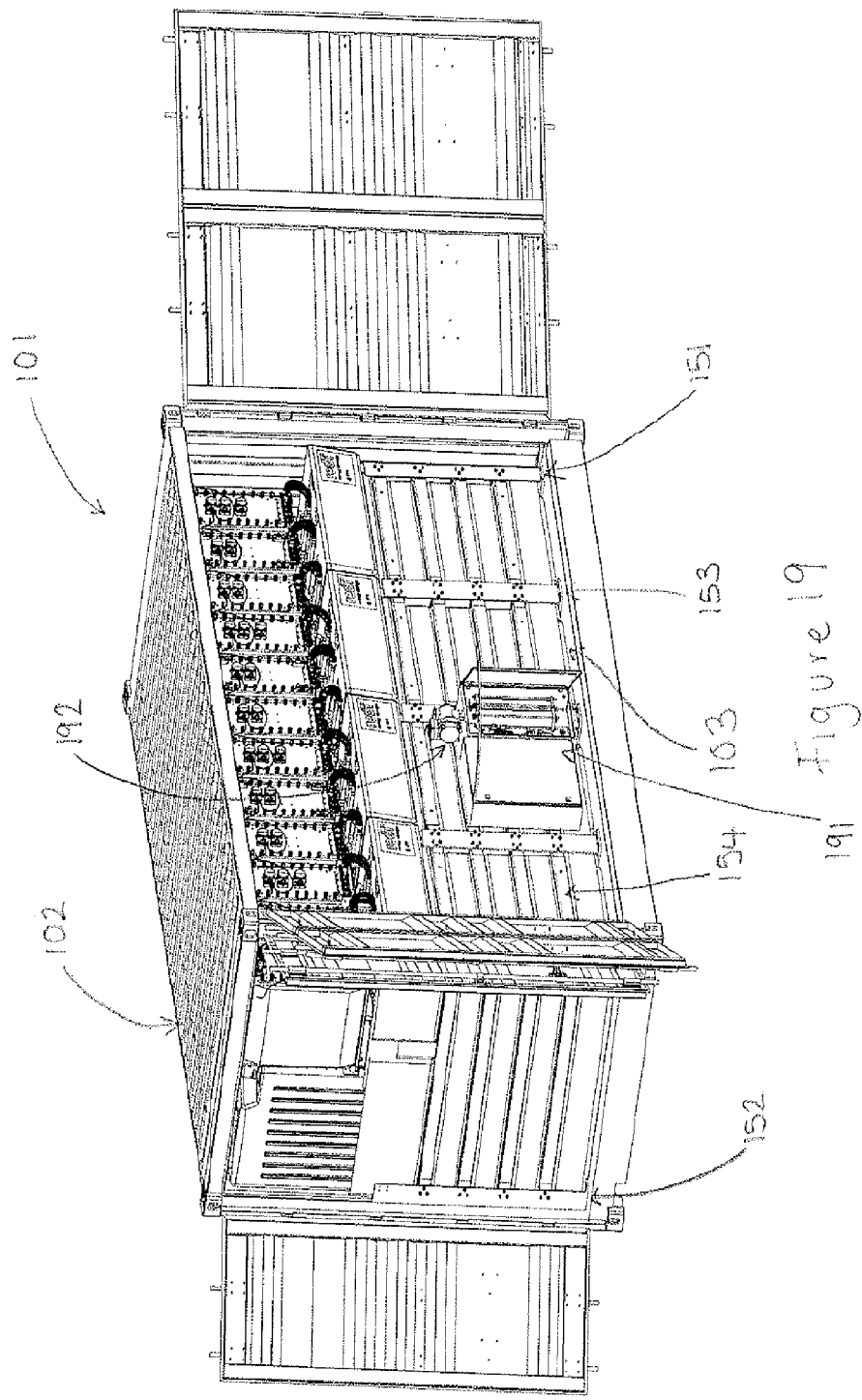
FIG. 19 is a perspective view of the cell stack within the container.

Referring to the drawings, a Vanadium redox battery 1 has a container 2 housing all main components of the battery. The container is an ISO transport container with hinged double doors 3,4 at both ends. The sides 5 are permanently closed, with one side having an electrical connection access hatch 6. The doors have for ventilation ports 7.

Internally the battery is divided into an electrolyte reservoir 11 in the lower part of the container and a slidable stack array 12 in the upper part.

The reservoir will be described first. It is comprised entirely of insulating, polymeric materials. At no point can is there any electrical contact between the either of the anolyte or the catholyte contained in the reservoir and the metalwork of the container. This feature, i.e. lack electrical contact with the container, even grounding of one DC side, is continued throughout the battery, which enables both terminals of the battery to be fully floating, whereby they can be connected in parallel or series as required.

The floor 21 of the reservoir is a panel of twin skin polypropylene construction with internal ribs and edge flanges closing the air gap between the skins. Since the details of the construction form no part of the invention and panels of this type are available at http://www.paneltim.com/, it will not be described in more detail.

Arrayed on the floor are ten circular cylindrical tanks 22, in two lines of five, one for anolyte and the other for catholyte. Each is made up of a main inner skin of 6 mm polyethylene sheet 23, with 6 mm thick ribs 24 and an outer skin 25 of 3 mm sheet. The ribs and skins are prefabricated and the tanks are then welded fluid tightly to the floor. A bottom margin 26 of the tank is left free of the outer skin to allow for flow of cooling air up between the skins. This absence allows for welding of the inner skin to the floor both internally and externally. At floor level, the tanks within each line are interconnected by pipework (not shown), for maintaining the electrolyte level even throughout each line, both in normal use but also during filling and emptying. At a level close to the top of the tanks, but below the level to which they are filled for use, adjacent tanks are interconnected by short lengths 28 of welded-in pipe. Internally each tank has a divider 29 extending above normal electrolyte level and transversely of the length of the line of tanks. A scallop 30 is provided in the bottom of the divider. This arrangement ensures that flow is in and down one side of the divide and up and out the other side, in the interests of promoting mixture and avoiding stagnation of electrolyte in the tank.

The one end tank of the lines have inlet filters 31 upstanding from the floor, with an inlet pipe 32 passing into the filter. The filters are of polyolefin for removing any debris from the cell stacks described below. The other end tank has a semi-circular top 33 to one side of a vestigial upper divider 34 in the position above the top 33 of the dividers in the other tanks, but not extending below the level of the top. Below the top, this tank has a scalloped lower divider 35 aligned transversely of the line of the tanks, that is at right angles to the upper divider. The top 33 is set below the normal electrolyte level, with the top fluid-tightly welded to the upper divider and the outer skin, which does not extend above the top at this side of the upper divider. The top has a reinforcement for mounting a pump 36, drawing electrolyte from an outlet pipe (not shown) extending down below the top 33. The pump is a magnetic drive pump and is which are hermetically sealed. It has a delivery pipe 38. A hydrogen vent 39 and a leakage return 40 are both provided at the exposed part of the divider. Each of the tanks is connected to the vents.

The tanks have removable lids 41 supported within their upper rims. Spaced a little below their tops, the space 43 below the tanks is closed off by a closure panel 44 welded to their outer skins. Extending up from the floor are reservoir side and end panels 45,46, which are welded as a fluid tight bund. At the end opposite from the pumps, a cut-out 47 is provided in the closure panel for cooling air, which is circulated from the space 43 via the gaps between the two skins 23,25 of the tanks, thus cooling them and the electrolyte within them.

Between the ones of the tanks having the filter columns 31 an inter-tank weir 48 is provided as a precaution against leakage of one electrolyte to the other electrolyte side of the cell stacks. Argon is fed to the tanks (from a non-shown source) and escapes together with any hydrogen released via the vent 39. This is restricted and the pressure at which the argon is supplied is monitored. Should that be a leak from one of the tanks to the space 43, there will be a temporary drop in the argon pressure, which can be detected to raise an alarm.

The reservoir is installed in an ISO transport container 2, with the floor 21 of the reservoir resting on the floor 51 of the container. The side panels 45 of the bund of the reservoir are a close fit between the side walls 5 of the container, whereby in the event of an electrolyte leak, the side panels are supported against bowing and collapse. At the ends of the container, within the doors, a steel end wall 52, comprising a plate 53 and cross members 54 secured to corner posts 55 of the container supports the end panels 46 of the bund.

On runners 56, fixed to the sides 5 of the container immediately above the bund, is supported the slidable stack array 12. It has a chassis 61 with moving runners 62, complementary with rollers 63 fixed inside the sides 5 of the container. Normally the chassis is held in a user position, in which the doors 3,4 are closed, by dead bolts 64. With these removed, the array can be slid out (once plumbing connections are undone). Movement of the array out of the doors is limited by a chain (not shown), secured at one end to the fixed runners and at the other end to the moving runners.

The chassis comprises:
Side members 611, to which the moving runners 62 are fastened,
Cross members 612 between the side members,
Uprights 613 from the side members,
Upper side members 614 at the top of the uprights,
Upper cross members 615 between the upper side members.

The chassis provides a space 65 for control circuitry at one end and a longer space 66 for accommodating cell stacks 67. At the space 65, the upper chassis members are not required and the space is enclosed by sheet metal panels, 68 enclosing circuitry 69, which as such forms no part of the present invention. To one side of the panel-work connection points 70 are provided, in a position aligned with the access hatch 6 when the chassis is in its use position. The panel work has doors 71 within the container doors 3,4 at this end. The doors 71 carry fans 72, which draw cooling air via vents 7 in the container doors into the space 65. The air cools the circuitry 68 and passes out of the panel work via a cut-out 74 in a bottom panel. Thence it flows into the reservoir space 43 via cut out 47, being directed there by a duct 75. The air finally leaves the container via corresponding vents 7 in the opposite end doors.

On the framework in the longer cell stack space 66 the cell stacks are mounted. Details of the stacks and their mounting components also as such form no part of the present invention. Anolyte and catholyte flow and return mains 81,82 are connected via respective branch pipes to the cell stacks themselves. The return mains 82 pass on the underside of the chassis 61 to unions with the respective inlet pipes 32 to the filters 31. The flow mains 81 similarly pass to the pump outlet pipes 37.

Connections between the mains and the inlet and outlet pipes can be made with elastomeric discs (not shown) captive between flanges 85 at the ends of the mains and the pipes. Disconnection is of course necessary for drawing of the chassis and the cell stack array from the container. The outlet pipes terminate below the top of the reservoir and end portions of the flow mains can be disconnected at unions.

Further details of the plumbing to the individual stacks will be within the capabilities of the skilled reader. One final detail only will be mentioned, each cell stack has a drip tray 91 beneath it with drain pipework 92 to the leakage return 40.

Referring now to FIGS. 12 to 24 of the drawings, another vanadium REDOX flow battery reservoir 101 is shown in a side opening ISO transport container 102. Arrayed along one side of the container, with an internal walkway 103 is a series of outer tanks 104, each containing a pair of inner tanks 105, 106, one for anolyte and the other for catholyte.

The tanks are polypropylene rotational mouldings.

The outer tanks are provided as bunds in case of leakage from the inner tanks. They provide the ability to duct cooling air flow around the inner tanks. The form of the inner tanks will be described in more detail first.

Each inner tank 105,106 has a flat base 111 with radiused, corners 112 at the foot of back, side and front walls 113,114,115. These walls are all corrugated, with grooves 116 extending up from the corners 112. The back wall 113 is slightly indented at 117 in the lower half of its height, with the grooves in it restricted to the lower half 118. The side walls 114 are full height 119 in rear portions of them, and step down 120 at mid width and step down further 121 at the front. The two side walls of each of the inner tanks are mirror images of each other. The front walls 115 are only the height of the front step down. At front corners, the quarter circle recesses 122 are provided up the inner tanks. In respect of the features described and other features to be described, the inner tanks 105,106 are identical to each other.

The outer tank 104 is simpler, being essentially rectangular again with a flat base 131 and radiused, corners 132 at the foot of with back side and front walls 133, 134,135 sized to receive the inner tanks. Small clearance is provided, which is liable to be taken up by flexure of the inner tanks on filling with electrolyte. The walls have four indented corrugation grooves 136 around them, whereby the tanks abut where the peaks of the corrugations coincide and air passages elsewhere. The front corners 137 are indented complementarily to the corners of the inner tanks, to interrupt air flow around inside the corners except at base level.

A separate upper rim 140 to the outer tank is provided, clipping on to it. It supports a front cover 141, below which an air circulation fan 142 is mounted at a cooling air inlet 1411 and from which a duct 143 leads down to the base 131.

Cooling air circulation will now be described. From the base of the duct 143, cooling air flow passes both to left & right towards the rear. To left and right, the air passes into the outwardly extending portions 144 of the bottom one of the grooves 136. Thence it passes back along the same groove at the bottom of the side walls and ultimately into the same groove in the back wall 133. All along the bottom groove, some of the air passes into the groves 116 in the walls of the inner tanks. Thus the air is distributed amongst the grooves. The air passing to the rear from the bottom of the duct 143 does so via the gap 145 left between the radiused corners 112 of the abutting side walls 114 of the two tanks. Indeed some of the air passing along the gap may pass to the bottom one of the grooves 136 at the back walls 133 of the inner tanks. Exact flow distribution will be in accordance with air flow resistance of the individual ones of the grooves 116. It should be noted that the indented front corners 137 of the outer tank fit against the matching recesses 122 of the inner tanks, to avoid escape of air. The outwardly extending portions 146 of the other three grooves 136 enable further lateral distribution of air flow between the grooves 116.

These grooves do not extend fully to the top of the walls of the inner tanks in which they are. However, they all, at least in the outer ones of the walls of the inner tanks, extend above the inner wall abutting band 147 of the top groove 136. This air can escape from them there.

The hydraulic pressure of the electrolytes in the inner tanks flexes them out against the outer tank, which is reinforced as described below. The two abutting inner walls have a metal sheet 148 inserted between them, to stabilise them against moving laterally and increasing the volume of one tank at the expense of the other. The cooling air can pass up along the grooves opening onto the sheet. An effect of the sheet is to allow air flow laterally at its top, level with the mid-height step in the side walls. Above this level the inner tanks tend to bow out slightly with curvature viewed down vertically, being constrained at their vertically extending centres. Their corrugation grooves stiffen them against bowing in the other plane. This bowing enhances escape of the cooling air at least from the rear and front ones of the grooves in the top portions of the abutting side walls 114.

For use, several, typically four, outer tanks each with two inner tanks are arrayed along one side of a side opening transport container 102. Secured in the container is a reinforcing, steel framework 151. This comprises angle pieces 152 at the four corners of the array and T pieces 153 at the intermediate corners of the outer tanks, together with horizontal members 154 between these upright 152,153, both around the outside of the array and between adjoin pairs of outer tanks. These members are received inwardly extending portions 154 of the grooves 136. Conveniently the framework is bolted together either of individual members or sub-assemblies. The indented nature of the outer tanks requires the tanks to be assembled into the framework as the latter is put together.

Conveniently the array of tanks leaves space for a walkway 103 in front of them within the container.

Each outer tank has supported on upper extensions 156 of the framework 151 between the tanks, a steel sub-frame 157, extending across the inner tanks above steps 158 in them at the side wall step downs 120. Further front steps 159 are provided beneath the cover 141 at the further step down 121. The metal sheet 148 has a flap over one of the inner tanks onto its step 158, for support of the sheet which does not extend to the full depth of the side walls abutting it.

On the sub-frame 157, via wheels 160 rolling on it, are three stacks 161 of vanadium REDOX cells. They are similar, one having an extra reference cell 162 on it. Construction of the cell stacks forms no part of this invention, and will not be described here. Details can be found at our WO 2006/111704 patent application. The main VA REDOX cells are separated into two pairs of cells in series with each other. This is to avoid full stack voltage across internal passages distributing electrolyte to individual cells in the stacks. For this reason, each cell stack has two anolyte flow points and two anolyte return points and four such catholyte points. Accordingly each stack has eight hoses 163 for flow and return of electrolyte.

The inner tanks have a number of detailed features:
Top accessory mounting plates 165 welded onto ledges 166 provided for them on the very top 167 of the tanks,
Left and right union plates 168,169 at the front of the top, these plate are welded over apertures left open during rotational moulding,
Single left unions 170 in the left plates,
Double right unions 1711,1712 in the right plates,
Instrumentation and gas supply unions 172 in the right plates,
Gas over-pressure vent unions 173 to the right of the accessory plates, opening in to the highest parts of the tanks,
Lower single union plates 174 to the right of the further steps 159,
Single unions 175 in the lower plates,
Further instrumentation and gas supply unions 176 in the lower plates,
Pump mounting plates 177 on the further step to the left of the lower union plates, The adjacent unions 170 and 1711 are inter-connected (by non-shown pipes) to obviate any leakage within a cell stacks over filling one inner tank at the expense of the other, the anolyte and catholyte being chemically the same with the vanadium at different valency states, whereby flow from one tank to the other results in loss of electrical charge without irreversible chemical mixing. The outer unions 170 and 1711 are blanked off. The second of the unions 1712 is for return of electrolyte.

Figure 24:
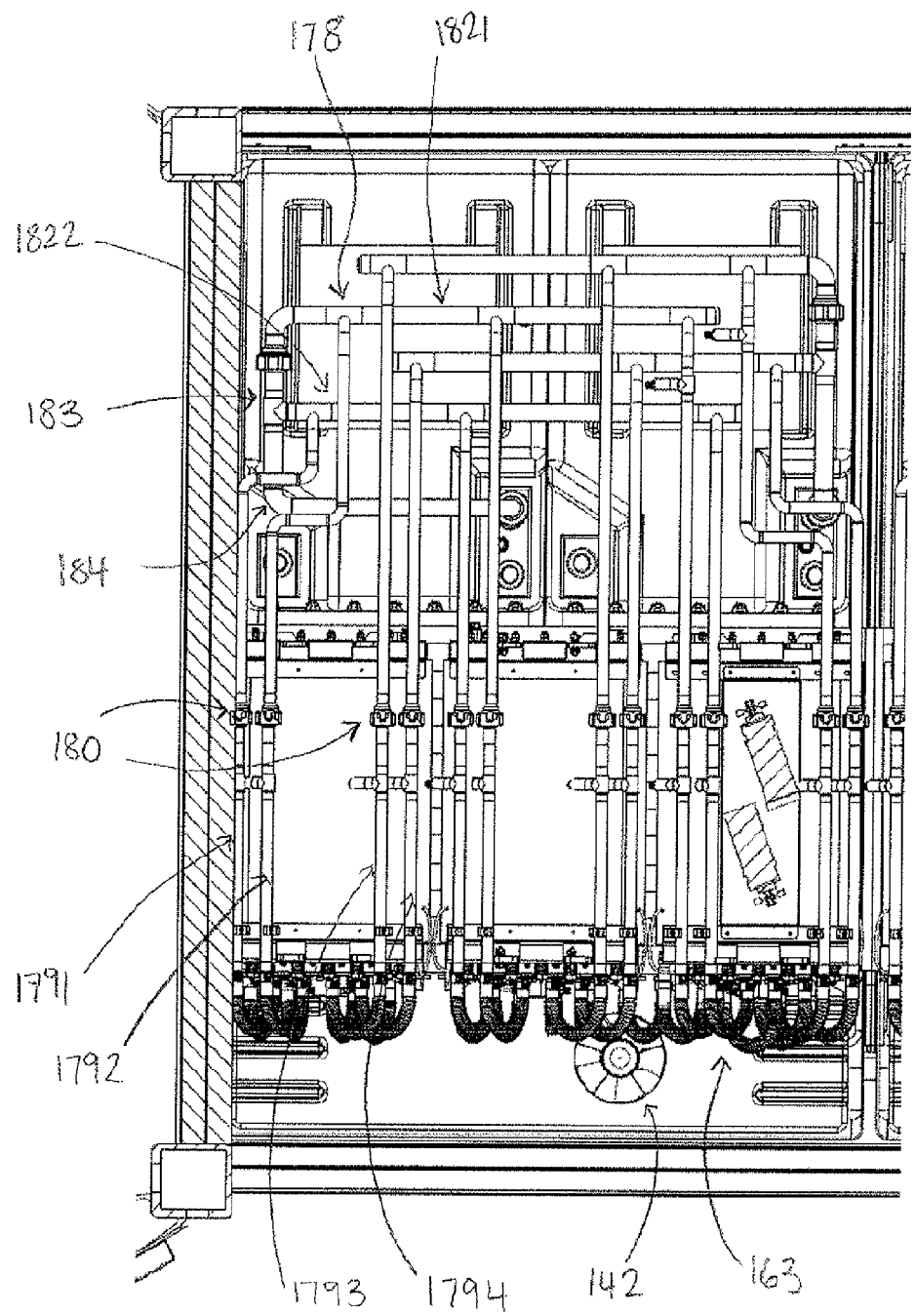
FIG. 24 is a plan view of detail "C" on FIG. 20 showing the piping on top of the cell stack.

Electrolyte pumps (not shown) are mounted on the plates 177. They draw electrolyte from the unions 175 and pass it to respective branched pipework 178. That beneath the cell stacks cannot be seen readily in the drawings. From the pipework the electrolyte is passed to the lower four of the hoses 163 to each cell stack. The electrolyte flows from the top of the cells stacks by the respective top hoses. The arrangement can be seen in FIG. 24. For each stack the four hoses lead to four pipes, typically 1791,1792,1793,1794. These have uncouplable unions 180 for cell stack replacement. The pipes 1791,1792 lead to part of the upper pipework 178 including respective branches 1821,1822, which join together at 183 to lead back as pipe 184 to unions 1712. With reference to FIG. 24 it can be seen that the pipes joining the branches closer to the joint 183 are longer than the other pipes, providing a longer flow path; whereas the other pipes are shorter but they join the branches further from the joint. The result is enhance resistance in the flow paths that potentially allow shunt currents between the two halves of the cell stacks externally to the stacks as such.

In the walkway 155 is installed a nitrogen generator 191 for passing nitrogen via the unions 173, to exclude oxygen from above the electrolytes. The nitrogen generator is an absorptive type available from Titan N2 Ltd., w: www.titan-n2.com.

Also adjacent the nitrogen generator is an air circulator 192 for the entire inside of the transport container. It and the fans 142 are operated thermostatically. They can be controlled in accordance with other indicators of the need to dissipate heat from the individual tanks or the reservoir as a whole, such as rise in pressure in the tanks. The fans can also be controlled to run at all times that the stacks are charging or discharging. Non-shown vents in the container can be provided.

The invention claimed is:

1. A reservoir for a redox flow battery comprising:
   at least one inner tank for electrolyte, the or each inner tank having at least one inner tank wall of polymeric material,
   an outer, bund tank around the or each inner tank, the or each outer tank having at least one substantially flat outer tank wall of polymeric material, wherein the inner tank is a self-supporting cylindrical polymeric material tank or is a flat-walled tank shaped complementary to the outer tank and provided with areas for abutting support of the inner tank by the outer tank and air circulation passage formations between the abutment areas; and
   wherein the reservoir further comprises:
   air circulation gaps or passages between the inner and outer walls or the inner and outer tanks, and
   an air circulation fan or pump for passing cooling air to the air circulation gaps or passages for cooling the electrolyte in the or each inner tank.

2. A reservoir in accordance with claim 1, wherein the or each inner wall is provided as a self-supporting circular cylindrical wall of polymeric material for its inner tank.

3. A reservoir in accordance with claim 2, wherein:
   reinforcement is provided around the outer tank for its support in event of inner tank leakage and the outer tank acting as a bund and
   the air circulation gaps or passages are spaces between the or each circular inner tanks and the substantially flat walled outer tank.

4. A reservoir in accordance with claim 3, wherein the reinforcement is a metal fabrication at least partially provided by walls of a transport container, in which the tanks are installed.

5. A reservoir in accordance with claim 1, wherein the inner and outer tanks are complementarily shaped, with the walls of one of the tanks being formed with:
   areas for abutting support of the inner by the outer and
   air circulation passage formations between the abutment areas.

6. A reservoir in accordance with claim 5, wherein:
   reinforcement is provided around the outer tank for its support in event of inner tank leakage and the outer tank acting as a bund and
   the air circulation gaps or passages are passages within the air circulation passage formations.

7. A reservoir in accordance with claim 6, wherein the reinforcement is a metal framework, provided within a transport container, in which the tanks are installed.

8. A reservoir in accordance with claim 7, wherein members of the framework are received in outer grooves of at least some of the outer walls, the grooves having bottoms providing the abutment support areas.

9. A reservoir in accordance with claim 6, wherein at least two inner tanks are provided within the or each outer tank, the inner tanks having neighbouring ones of their inner walls which abuttingly support each other, the inner tanks being respectively for anolyte and catholyte.

10. A reservoir in accordance with claim 9, including a reinforcing sheet between the neighbouring ones of their inner walls which abuttingly support each other.

11. A reservoir in accordance with claim 5, wherein either or both of the inner and outer walls are corrugated to provide the air passage formations and the abutment support areas.

12. A reservoir as claimed in claim 9, wherein corrugations of the inner walls and of the outer walls are orthogonal for distribution of air circulation.

13. A reservoir in accordance with claim 9, wherein two inner tanks are provided and their wall corrugations are at least substantially vertical and their inner walls have rounded lower corners with inner tank bottoms for providing air circulation to bottoms of the corrugations.

14. A reservoir in accordance with claim 5, wherein the inner tanks are substantially cuboid with an upper, primary cuboid recess for accommodating redox cell stacks.

15. A reservoir in accordance with claim 14, wherein the inner tanks have a secondary cuboid recess below the primary recess for locating electrolyte circulation pumps for the respective electrolytes of the inner tanks, with electrolyte flow connections at the secondary recess and return connections at tops of the inner tanks.

16. A reservoir in accordance with claim 15, including an air circulation pump between the electrolyte pumps, for discharging air downwards for upwards return.

17. A reservoir in accordance with claim 16, including control circuitry for powering the air circulation pump in accordance with whether the electrolyte circulation pumps are being operated and/or thermostatically in accordance with the temperature of the electrolyte in the inner tanks.

18. A reservoir in accordance with claim 14, including
   rails, supported on the framework, for sliding accommodation of the stacks,
   plumbing provided with detachable connections for electrolyte flow and return to and from the stacks.

19. A reservoir in accordance with claim 18, wherein both flow and return plumbing is branched to provide parallel flow paths to the stacks for electrolyte flow and return to two halves of the stacks.

20. A reservoir in accordance with claim 5, wherein the tanks are arrayed along the lengths of a side opening transport container, with a lengthways walkway within the container for access to the individual tanks.

* * * * *